Oct. 9, 1962 — M. H. BALLER — 3,057,369
EXPLOSIVE VALVE-SAFETY TYPE
Filed April 28, 1960 — 2 Sheets-Sheet 1
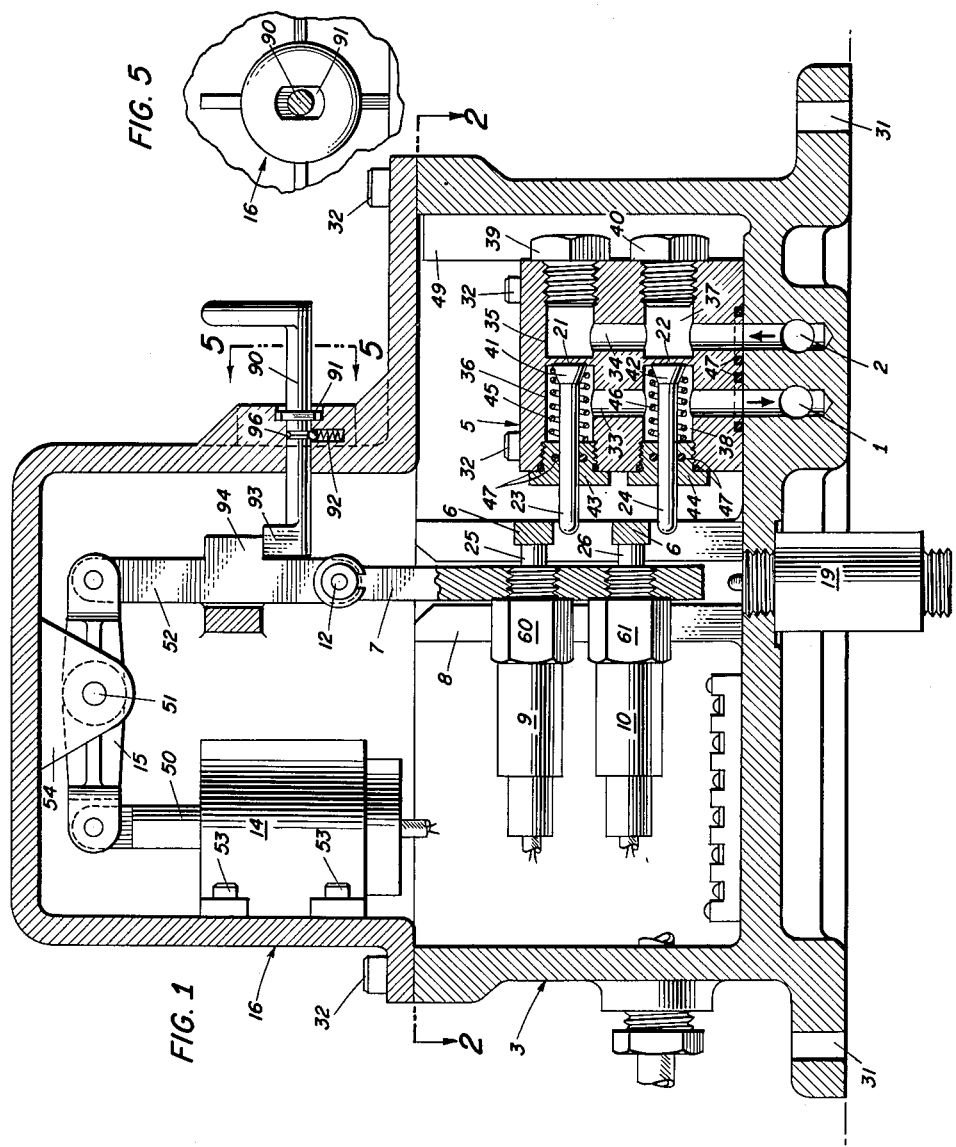
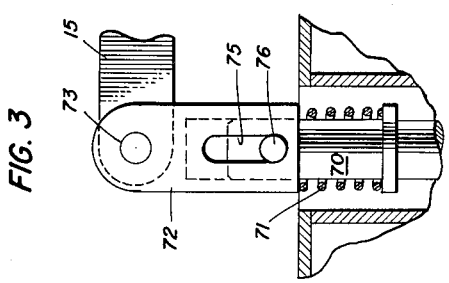
INVENTOR
Maurice H. Baller
BY
ATTORNEYS Oct. 9, 1962 M. H. BALLER 3,057,369
EXPLOSIVE VALVE-SAFETY TYPE
Filed April 28, 1960 2 Sheets-Sheet 2
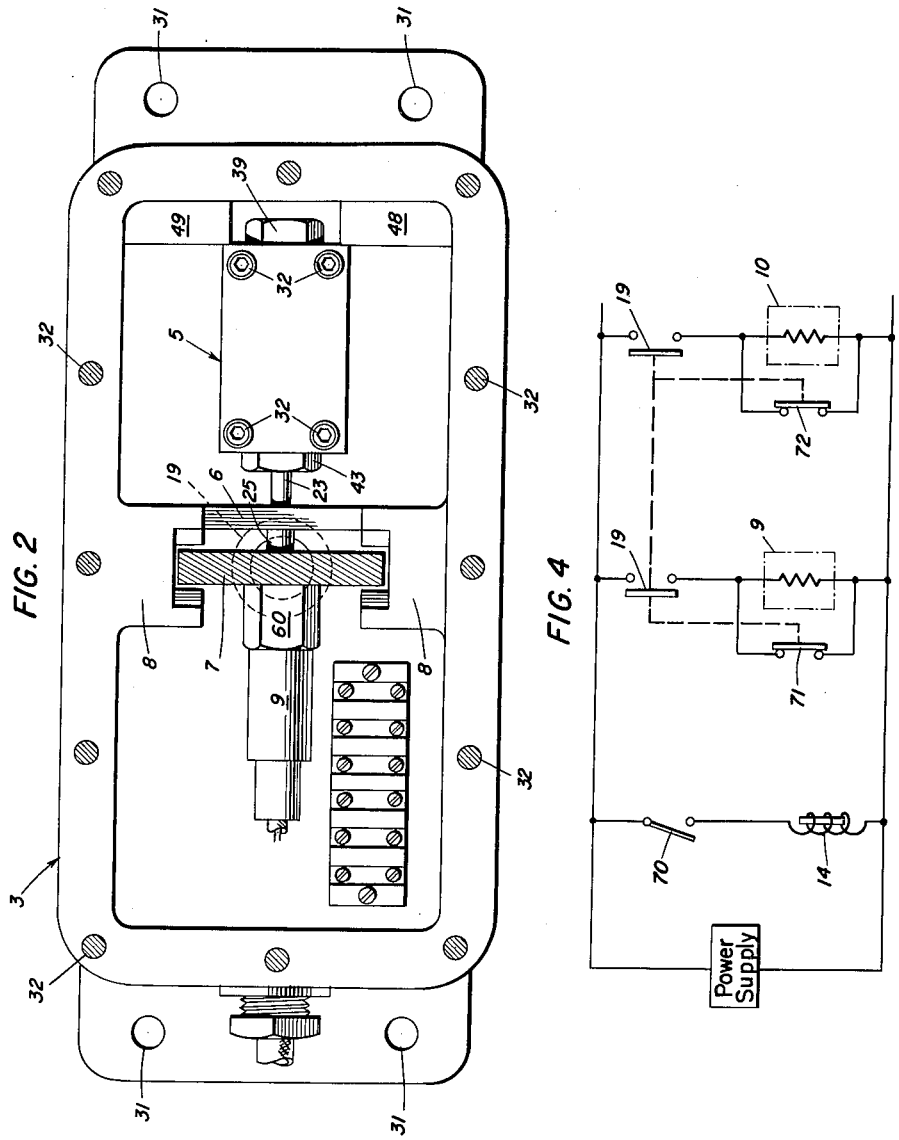
INVENTOR
*Maurice H. Baller*
BY
*ATTORNEYS*

3,057,369
EXPLOSIVE VALVE-SAFETY TYPE
Maurice H. Baller, Washington, D.C., assignor to the United States of America as represented by the Secretary of the Navy
Filed Apr. 28, 1960, Ser. No. 25,495
15 Claims. (Cl. 137—68)
(Granted under Title 35, U.S. Code (1952), sec. 266)

The invention described herein may be manufactured and used by or for the Government of the United States of America for governmental purposes without the payment of any royalties thereon or therefor.

The present invention relates generally to valves and more particularly to an explosive actuated leakproof valve.

Such valves find use as pilot valves which control the operation of larger fluid servo-operated valves. A need for such a valve is necessary in many military applications.

For example, in submarines large fluid servo-operated launch valves are utilized to control the high pressure fluid which effects the ejection of missiles therefrom. The operation of each launch valve is controlled by a smaller pilot valve. Should the pilot valve have a slow leak around or through the valving device or be of a nature that it could easily be inadvertently actuated, it would cause premature actuation of the launch valve and consequently, the torpedo or missile would be launched at an inopportune time. This is only one of many examples which could be recited and by which the wide application of the present invention could be emphasized.

The above explanation is by way of example of a use of such a valve and therefore, this example is not intended to convey any limitation on the use of such a valve.

Accordingly, one object of the present invention is to provide a valve which is leakproof.

Another object of this invention resides in the provision of a valve which is explosively operated.

Still another object of this invention is to provide an explosive valve which is free from misfiring or inadvertent actuation.

Another object of this invention is to provide a valve which is capable of controlling extremely high pressures.

Yet another object of the herein disclosed invention is to provide a valve with means to misalign the valve actuation means and other portions of the valve structure to prevent inadvertent actuation of the valve.

A further object of the invention is to provide a conduit with rupturable diaphragm which normally prevents flow in the conduit and an explosively operated plunger to rupture the diaphragm to thereby permit flow through the conduit.

An additional object of the present invention is to provide a manually operable safety device to lock a valve mechanism in a position misaligned from the valve element.

Other objects and many of the attendant advantages of this invention will be readily appreciated as the same becomes better understood by reference to the following detailed description when considered in connection with the accompanying drawings wherein:

FIG. 1 is a longitudinal section view of the present invention;

FIG. 2 is a section view taken substantially along line 2—2 of FIG. 1;

FIG. 3 illustrates a solenoid operated bell-crank means for connection with other elements of the invention in a manner different from that disclosed in FIG. 1;

FIG. 4 is a schematic circuit diagram of circuitry suitable for employment with the invention; and FIG. 5 is a section view taken substantially along line 5—5 of FIG. 1.

Referring now to the drawings, in FIG. 1 there is shown the lower housing and base 3 which is adapted to be securely mounted by use of suitable fastening means which may pass through bores 31. An upper housing 16 is removably mounted on the lower housing 3 as by bolts 32, for example. Both housing means 3 and 16 are constructed of any material suitable for the purpose such, for example, as cast iron or cast aluminum. However, either the material or method of shaping the housings can be varied in any of the manners well known in the art.

Conduits 1 and 2 are formed in the lower part of the lower housing 3. These conduits, as shown in FIG. 1, do not communicate with each other because of the presence of the frangible diaphragms or thin metal sections 21 and 22, as best shown in FIG. 1.

These frangible diaphragms or thin metal sections 21 and 22 are mounted in the valve diaphragm unit 5. The unit 5 is removably mounted in the lower housing 3. Fastening means 32, as shown in FIG. 2, securely hold the diaphragm unit 5 in contact with the housing 3 and also permit the unit 5 to be removed from the lower housing 3. The unit 5 contains conduits 33 and 34 which communicate with conduits 1 and 2, respectively. Conduits 33 and 34 are normally separated by the frangible diaphragms or thin metal sections 21 and 22. The diaphragms are an integral part of the unit 5 formed as shown in the drawings by a suitably shaped drill being driven a predetermined depth into the channels 35, 36, 37, and 38. The channels 35 and 37 are then closed by plugs 39 and 40. In channels 36 and 38 are mounted plungers 23 and 24 which have ends 41 and 42 outwardly flared, as shown in FIG. 1. Plugs 43 and 44 have the dual purpose of supporting rams or plungers 23 and 24 and of closing the channels 36 and 38. Biasing, resilient, or spring means 45 and 46 are positioned between the plugs 43 and 44 and the flared ends 41 and 42 of rams 23 and 24 in a manner to bias the plungers toward the diaphragms 21 and 22.

Suitable sealing means, such as O-rings 47, are mounted where necessary to make the fluid passages 1, 2, 33, and 34 fluid tight.

The lower housing 3 contains ram-thrust back-up surfaces 48 and 49, as shown in FIG. 2. These surfaces support the valve diaphragm unit 5 against lateral movement when force is exerted to rupture the diaphragms 21 and 22.

To remove unit 5, as is necessary after the diaphragms 21 and 22 have been ruptured and it is desired to prepare the valve for another cycle of operation, it is only necessary to remove the upper housing 16 and the fastening means 32 which hold the unit 5 in the lower housing 3. The unit 5 is then lifted out of the lower housing and replaced with either another unit or the ruptured diaphragms are removed and new diaphragms are installed in the same unit.

Explosive ram units 9 and 10 with their respective rams 25 and 26 are supported and removably secured to ram crosshead 7. The ram crosshead 7 is guided in its movement by guides 8, as shown clearly in FIG. 2. The ram crosshead 7 is moved vertically by the action of solenoid means 14 which acts through rod 50, bell-crank 15, and link 52. Solenoid means 14 is removably mounted in the upper housing 16 by fastening means 53. The bell-crank 15 rotates about pivot 51 which is removably mounted on projection 54, an integral part of the upper housing 16. Unlink pin 12 connects link 52 and the crosshead 7. This pin is readily removable through an opening (not shown) in the upper housing 16 when the upper housing is mounted on the lower housing. This expedient permits rapid removal of the upper housing 16 and consequently the rapid replacement of the explosive rams 9 and 10 and unit 5.

The explosive ram units 9 and 10 are in threaded engagement with the cross head 7, as shown in FIG. 1.

This arrangement permits the explosive ram units to be readily removed and replaced when the upper housing 16 is removed. Surfaces 60 and 61 are so shaped as to be readily engaged by a wrench so that the ram may be tightened to or loosened from the crosshead.

The ram crosshead is mounted with sufficient clearance in the crosshead guide 8 to prevent "bending" of the crosshead due to movement perpendicular to its normal movement caused by the rotation of crank 15 about pivot 51.

The explosive ram units are of a conventional squib type and are commercially manufactured. These units contain an explosive which is exploded by an electrical detonator and which drives the rams 25 and 26 outwardly when exploded.

The crosshead guide 8 has mounted thereon ram assembly gages 6, as shown in both FIGS. 1 and 2. These gages permit proper positioning of the ram units 9 and 10 when they are being mounted. That is, the rams are prevented from being threaded into the crosshead so that when the crosshead moves downwardly and toward a position of alignment with plungers 23 and 24, prior to alignment it will contact the side of the plungers and thereby be prevented from reaching a position of axial alignment with the plunger.

It will be understood that during operation, before fluid flow can be established between conduit means 1 and 2, the thin-walled sections or diaphragms 21 and 22 must be ruptured. This is performed by the plungers 23 and 24 with their outwardly tapered ends 41 and 42. These plungers are driven toward the right, as viewed in FIG. 1, by the explosive action of rams 9 and 10, to a position adjacent the bolts 39 and 40. Springs 45 and 46 maintain the plunger in the latter position thereby preventing undesirable obstruction of fluid flow between the channels 1 and 2. The provision of two thin-walled sections 21 and 22 with their respective plungers 23 and 24 ensures that the valve will be actuated even if one of the explosive ram units fails to fire or for any other reason one diaphragm is not ruptured.

The crosshead 7, upon which the explosive ram units 60 and 61 are mounted, when in its uppermost position as illustrated in FIG. 1, misaligns the rams 25 and 26 of the explosive ram units 9 and 10 and plungers 23 and 24. This misalignment obviates the possibility that either diaphragm 21 and 22 will be ruptured by an undesired inadvertent firing of either or both the explosive ram units due to shock, stray electrical currents or for any other reason. The crosshead assembly is moved vertically by action of the solenoid 14. Hence, the solenoid 14 must be actuated to thereby align the rams 25 and 26 with plungers 23 and 24, respectively, before the diaphragms 21 and 22 may be ruptured. While the preferred embodiment of the invention is to bring the rams 25 and 26 into alignment with the plungers 23 and 24, it is also possible to have the rams always in alignment with the plungers and to move the rams and plungers as a unit into and out of alignment with the frangible diaphragms 21 and 22.

In the circuitry illustrated in FIG. 4 the switch 70 which controls the operation of solenoid 14 is connected in parallel with the circuit breakers 19 and the explosive squibs 9 and 10. Thus before the explosive units can be detonated it is necessary that the solenoid be actuated by closing the switch 70. This action also causes the solenoid 14 to be actuated which in turn, through bell crank 15 and link 52 moves the crosshead 7 downwardly to a position in which the explosive rams 25 and 26 are in axial alignment with plungers 23 and 24, respectively. As the crosshead moves into this latter position the switch 19 is actuated. This switch in turn opens the normally closed switches 71 and 72 and closes the switches 19 thereby detonating the squibs 9 and 10. This explosion causes rams 25 and 26 to drive plungers 23 and 24, respectively, to the right, as viewed in FIG. 1, thereby rupturing diaphragms 21 and 22. Rupture of these diaphragms permits flow of fluid between conduits 1 and 2.

After the valve unit is actuated through one cycle, it is necessary to replace the explosive ram units 9 and 10 and the diaphragms 21 and 22 before the valve is again operable. To replace these items it is merely necessary to remove bolts 32 and the unlink pin 12. The unlink pin 12 can be conveniently removed from outside the upper housing 16. Once these bolts and the unlink pin are removed, the upper housing is removed thereby permitting access to the inner chamber of the lower housing 3. The explosive rams are readily removed by unscrewing the same from the crosshead 7. Wrench surfaces 60 and 61 permit the tightening and loosening of these units by a suitable tool or wrench.

To remove the valve unit 5 in order to replace the same or to replace diaphragms therein, it is merely necessary to remove the four bolts 32 and lift the unit from the housing. If the valve unit is of the type that the thin-walled sections 21 and 22 are an integral part thereof the entire valve unit is replaced. Should the thin-walled sections or diaphragms be of the replaceable type it is merely necessary to replace these diaphragms in the valve unit.

As shown in FIG. 5, link 52 is capable of being locked against downward movement by lock means or key 90. The key is shaped to be fitted through the upper housing 16 in a manner to prevent relative rotary motion. The key is inserted into the housing until the flange 91 prevents further inward movement. When the flange 91 engages the housing the locking end 93 engages the abutment 94 on link 52 thereby preventing downward movement of link 52. Spring biased detent means 92 engages the notch 96 on the key member to hold the key in its locking position. As seen in the drawing the key may be removed by pulling it axially from the housing.

The locking means described herein is one which has been found satisfactory. However, many other locking expedients can be utilized to fulfill the requirements of this invention. For example, a key arrangement which locks link 52 against movement when the key was removed could be employed.

In FIG. 3, there is shown another means by which the solenoid arm 50 may be connected to the bell-crank 15. A spring biased lost motion connection is provided between the solenoid 14 and the bell crank 15 to ensure that when the bell-crank is locked against movement by locking means 90, the solenoid will not be damaged due to overheating caused by its inability to respond to energization of its coil. In normal operation, that is when the movement of link 52 is not restrained by the locking means, the spring 71 is of sufficient strength to cause the connection to perform as if it were a rigid connection. That is, when the solenoid is actuated this motion is transferred to the bell crank through the uncompressed spring 71 and link 72. However, when the bell crank is locked in position, the spring 71 is depressed when the solenoid is actuated and sequentially the lost motion connection permits the solenoid shaft to be extended thereby preventing damage to the solenoid. Should the bell-crank be unlocked or the solenoid de-energized the spring 71 will be extended. The lost motion connection includes a slot 75 in link 72 and a pin 76 mounted crosswise in link 70. The link 70 slides axially within the link 72, this movement being limited by the extent that the pin 76 will move longitudinally in the slot. While this is a preferred configuration of the lost motion connection, many others are known in the art and could be employed instead of the preferred embodiment.

Obviously many modifications and variations of the present invention are possible in the light of the above teachings. It is therefore to be understood that within the scope of the appended claims the invention may be practiced othewise than as specifically described.

What is claimed is:

1. An explosive-actuated valve comprising a fluid conduit therethrough, frangible means normally preventing flow in said conduit, first means for rupturing said frangible means, and second means operable for moving at least a portion of said first means out of alignment with said frangible means.

2. The device of claim 1 wherein said first means comprises plunger means reciprocally mounted in alignment with said frangible means and explosive ram means for actuating said plunger means to rupture said frangible means.

3. The device of claim 2 wherein said second means comprises a crosshead means for supporting said ram means, crosshead guide means for restricting the movement of said crosshead to a predetermined path, and means for reciprocally moving said crosshead to move said ram means into and out of alignment with said plunger means.

4. The device of claim 3 wherein said means for reciprocally moving said crosshead comprises a solenoid, and positioning means mounted on and projecting from said crosshead guide means to permit proper placement of said explosive ram means.

5. The device of claim 3 wherein said means for reciprocally moving said crosshead includes a solenoid connected electrically in parallel with a source of power, and in series therewith a firing switch, and in parallel therewith an explosive ram firing means, said last-mentioned means comprising explosive ram igniting means and a crosshead actuated switch, said firing means being in series with said crosshead actuated switch.

6. The device of claim 5 in which said explosive ram firing means comprises a shorting circuit in parallel therewith, said shorting circuit being broken sequentially with the closing of said crosshead actuated switch.

7. A valve assembly comprising a lower housing and an upper housing, a valve unit removably mounted in said lower housing, first and second conduits in said lower housing, third and fourth conduits in said valve unit, said first conduit normally communicating with said third conduit and said second conduit normally communicating with said fourth conduit, a thin-walled frangible member mounted in said valve unit, said frangible member normally preventing fluid communication between said third and fourth conduits, plunger means mounted in said valve unit, said plunger means being operable to rupture said frangible means, a ram-aligning crosshead means reciprocally mounted in said lower housing, electrically ignited explosive ram means mounted on said crosshead, said crosshead having a first position wherein said ram means is axially aligned with said plunger means and a second position wherein said ram means and said plunger means are misaligned whereby said frangible member can be ruptured when said crosshead is in said first position and said frangible member cannot be ruptured when said crosshead is in said second position.

8. The valve assembly of claim 7 wherein said electrically ignited explosive rams are actuable when said crosshead is in said first position and inoperable when in said second position.

9. The valve assembly of claim 7 wherein a solenoid is mounted in said upper housing, a bell-crank lever having first and second ends and being pivotably mounted in said upper housing, said solenoid being operably connected to said first end of said bell-crank lever, a link having a first end operably connected to said second end of said bell crank lever, and said link having a second end disengageably connected to said crosshead.

10. The valve assembly of claim 7 wherein a firing circuit is provided for actuating said explosively ignited ram means, said circuit having a normally open switch mounted in the lower housing and positioned in the line of travel of said crosshead whereby said crosshead will contact said switch and close said circuit when said crosshead is moved into said first position.

11. The valve assembly of claim 10 wherein said firing circuit has an electrical power supply in series with said electrically ignited explosive ram means, and said switch is connected in series with said electrically ignited explosive ram means and said power supply, whereby said explosive ram means will be ignited when the crosshead is in said first position.

12. The valve assembly of claim 11 wherein a shorting circuit is connected in parallel with said electrically ignited explosive ram means and in series with said power supply and said switch, said shorting circuit being open when said crosshead is in said first position and closed when said crosshead is in said second position.

13. The valve assembly of claim 9 wherein lock means are provided to lock said crosshead means in said second position.

14. The valve assembly of claim 9 wherein said solenoid and said first end of said bell-crank lever have interposed therebetween a spring-biased lost motion means.

15. An explosively-actuated valve comprising a fluid conduit therethrough, frangible means normally preventing flow in said conduit, first means including electrically ignited, explosively-actuated ram means for rupturing said frangible means, second means for moving at least a portion of said first means out of alignment with said frangible means, a firing circuit connected to said electrically ignited ram means and actuating means responsive to movement of said second means whereby said circuit is completed when said first means is completely in alignment with said frangible means and open when said first means is not completely in alignment with said frangible means.

References Cited in the file of this patent
UNITED STATES PATENTS 2,761,426    Soman _____ Sept. 4, 1956

FOREIGN PATENTS 1,155,839    France _____ Dec. 2, 1957

OTHER REFERENCES

Explosive Actuated Valves, by Maurice W. Connell, September 24, 1956, Catalog 5501–xv. (Copy in Div. 39.)